(12) United States Patent
Furman

(10) Patent No.: US 9,516,953 B1
(45) Date of Patent: Dec. 13, 2016

(54) STAND SYSTEM FOR SUSPENDING A BABY CAR SEAT ON BABY CAR SEAT SLING

(71) Applicant: Mark P Furman, Barrington, IL (US)

(72) Inventor: Mark P Furman, Barrington, IL (US)

( * ) Notice: Subject to any disclaimer, the term of this patent is extended or adjusted under 35 U.S.C. 154(b) by 0 days.

(21) Appl. No.: 14/935,447

(22) Filed: Nov. 8, 2015

(51) Int. Cl.
*B60N 2/28* (2006.01)
*A47D 1/08* (2006.01)
*A47D 1/00* (2006.01)
*A47D 13/10* (2006.01)

(52) U.S. Cl.
CPC .............. *A47D 1/08* (2013.01); *A47D 1/002* (2013.01); *A47D 13/107* (2013.01); *B60N 2/2848* (2013.01)

(58) Field of Classification Search
CPC ........... B60N 2/26; B60N 2/2848; A47D 1/08; A47D 1/10; A47D 1/002; A47D 13/107; A47D 13/10
USPC ........ 248/163.1, 168, 440.1, 177.1, 187.1,248/188.2, 188.8, 163.2, 166, 170, 188.1, 688,248/615, 673, 677, 188.9, 370; 135/72; 297/275
See application file for complete search history.

(56) References Cited

U.S. PATENT DOCUMENTS

| | | | | |
|---|---|---|---|---|
| 130,397 A * | 8/1872 | Wells | ............... | A47D 13/107 297/275 |
| 788,150 A * | 4/1905 | Winn | ............... | A47D 13/107 248/329 |
| 1,361,469 A * | 12/1920 | Kingsbury | ......... | A47D 13/105 248/163.2 |
| 1,390,502 A * | 9/1921 | Clouser | ............... | A47D 13/105 297/274 |
| 1,866,175 A * | 7/1932 | Rogers, Jr. | ......... | A47D 13/105 248/163.2 |
| 2,408,002 A * | 9/1946 | Shurtliff | ............. | A47D 13/105 297/275 |
| 3,519,239 A * | 7/1970 | Rohrer | .................. | A63G 9/00 16/42 T |
| 4,120,280 A * | 10/1978 | Iverson | ............. | A47J 37/0763 126/30 |
| 4,997,152 A * | 3/1991 | Wagman | ............... | B66D 3/10 248/168 |
| 5,528,479 A * | 6/1996 | Chen | .................... | F21S 6/005 248/163.1 |
| 7,172,512 B2 * | 2/2007 | Be | ......................... | A63G 9/12 135/135 |
| 7,392,610 B2 * | 7/2008 | Jedlicka | ............. | G09F 15/0062 116/173 |
| 8,286,281 B1 * | 10/2012 | Toothman | ........... | A61G 7/1015 248/166 |
| 8,342,987 B2 * | 1/2013 | Shaw | ................ | A63B 69/0075 473/419 |
| 2007/0090237 A1 * | 4/2007 | Hsu | ...................... | F16M 11/14 248/178.1 |

(Continued)

*Primary Examiner* — Jonathan Liu
*Assistant Examiner* — Muhammad Ijaz

(57) ABSTRACT

A stand system suspends a baby car seat on baby car seat sling in which the baby car seat may pivot freely in any direction. A mounting plate elevated above the floor by three elongated leg supports attaches to the baby car seat sling harnessing a baby car seat is used as a platform for holding the suspended baby car seat in a laying position located below the mounting plate above the floor. Each elongated leg equal in length comprise 5 dowel sections. A three-way brace across the bottom of the elongated legs interconnects the elongated leg's foot-end to a center point. The disclosed stand system which is the product invention may be easily assembled by hand for product use and disassembled for compact storage and ease of transportation.

2 Claims, 11 Drawing Sheets

(56) References Cited

U.S. PATENT DOCUMENTS

| | | | |
|---|---|---|---|
| 2009/0131185 A1* | 5/2009 | Speedie | A47D 9/02 472/119 |
| 2011/0012394 A1* | 1/2011 | Furman | A47D 13/02 297/183.1 |
| 2011/0260130 A1* | 10/2011 | Curtis | A47D 13/063 256/25 |
| 2011/0319181 A1* | 12/2011 | Miller | A63G 9/16 472/119 |
| 2012/0119549 A1* | 5/2012 | Speedie | A47D 9/02 297/217.4 |

* cited by examiner

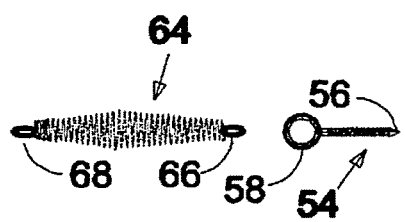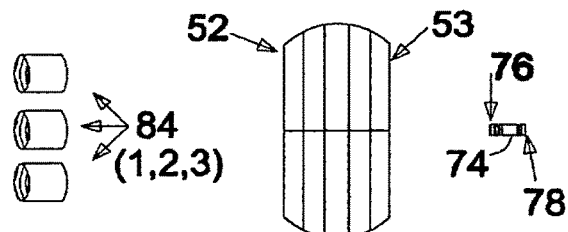
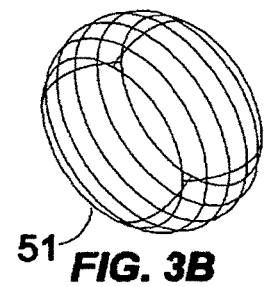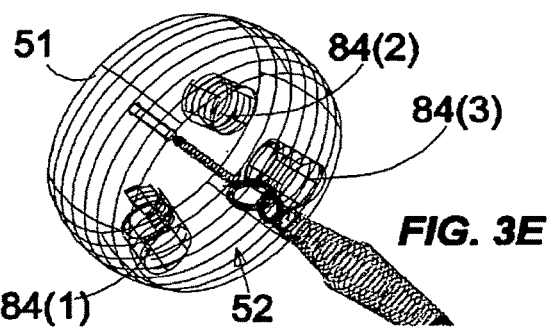
FIG. 3B          FIG. 3E
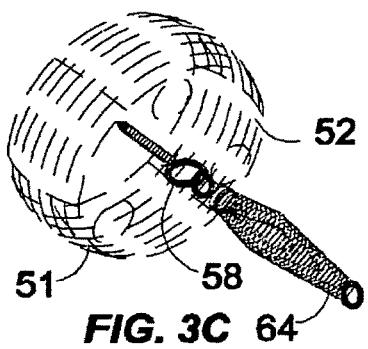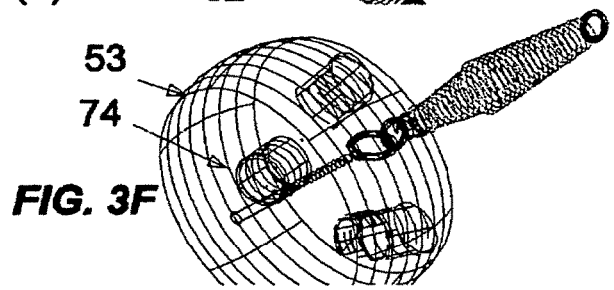
FIG. 3C          FIG. 3F
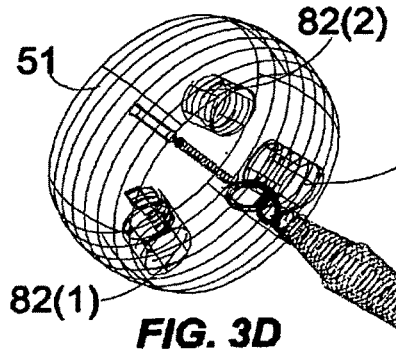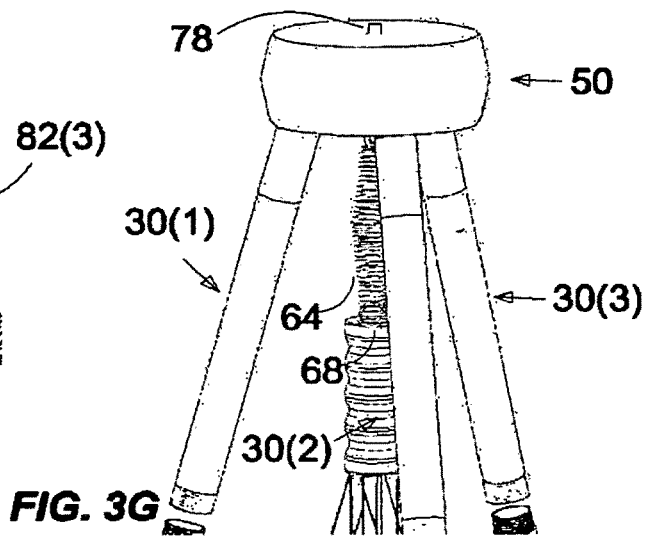
FIG. 3D          FIG. 3G

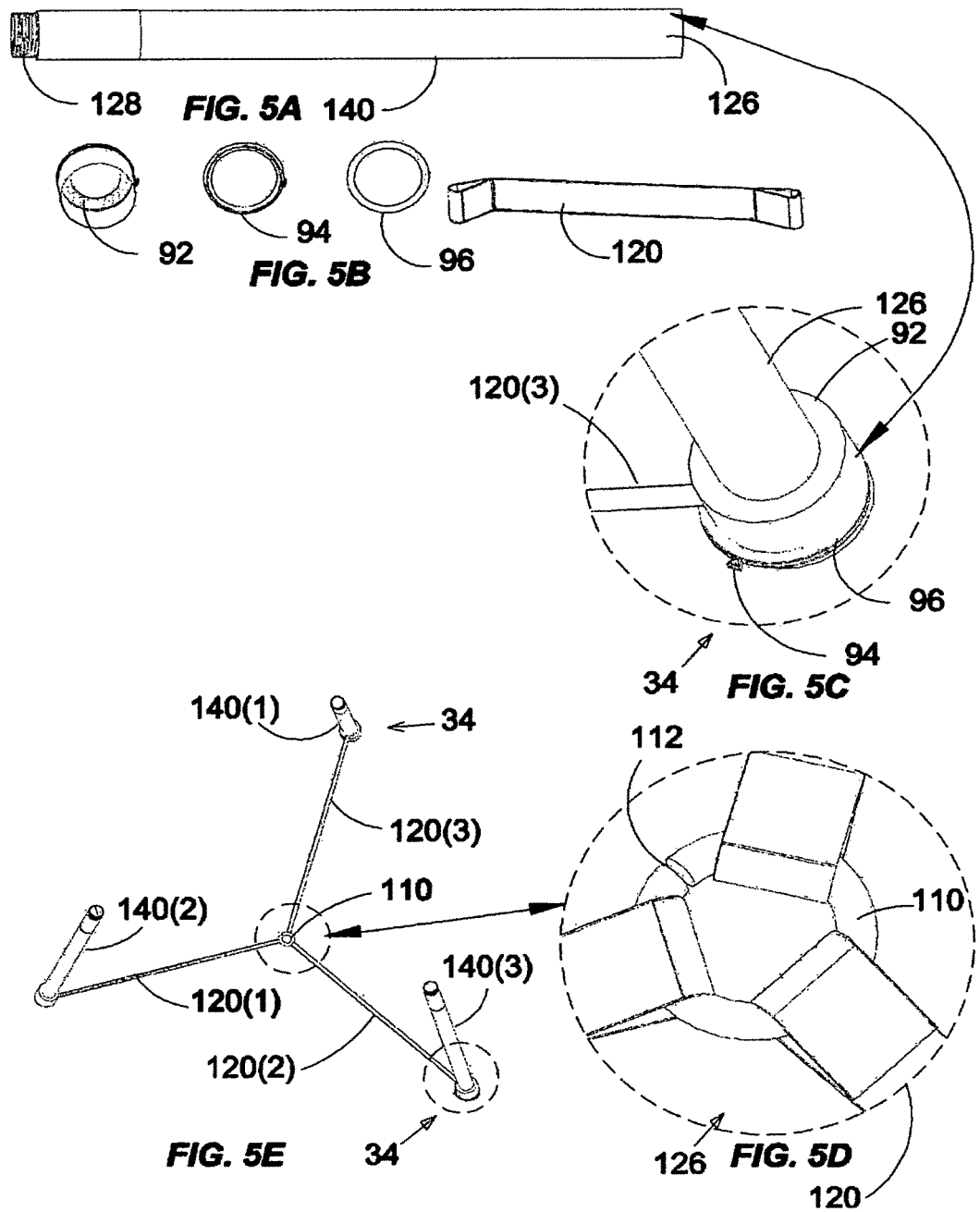

STAND SYSTEM FOR SUSPENDING A BABY CAR SEAT ON BABY CAR SEAT SLING

FIELD OF THE INVENTION

The present invention is in the area of weight supporting stand systems, and more particularly pertains to a portable stand system for supporting a baby car seat on baby car seat sling above the floor, which may be easily disassembled for compact storage and ease of transportation.

BACKGROUND

Stand systems with three-legged frame for supporting weight from the mounting plate used as a platform, either ontop or from bottom of the mounting plate, apply to a wide range of objects including stools, tables, stands, tripods, frames, easels, pedestals, apparatuses and the like. Often made of wood, plastic, or metal materials, these objects that equip an indoor or outdoor space are functional and are fixed or movable within the space. It is widely known that some of these objects are intended to support various human activities, such as, seating or to suspend weight from a mount used as a platform, holding the object at a convenient height above the floor for work, entertainment, or relaxation. The seat is suspended by a pre-shaped frame, chain, rope, fabric, webbing and the like.

Swing stand systems for supporting human weight from the mounting plate used as a platform apply to pre-fabricated finished products. One such swing stand system assembly is a baby seat swing. Pre-fabricated baby seat swings will have a fixed base, arm and leg, mount, and seat. The swing is either hand-swayed or motorized-to-sway. Pre-fabricated swing stand systems with swing motorized-to-sway are configured to move in a restricted direction in a front-to-back and side-to-side motion by means of a mechanism powered by electric power. Pre-fabricated swing stand systems without swing motorized-to-sway consist of a seat supported from three or more points and are physically pushed by a human to get a swinging motion. Both types of swing stand systems are products made up of pre-assembled proprietary factory-made parts into a single purpose unit sold as a final product.

A study of the market on prefabricated baby seat swing systems acknowledges that the market for such products is very large and the designs are limitless. However, the problem with limitless designs of disposable pre-fabricated baby seat swings that serve only one purpose, versus such products that double-up on existing products on the market to serve a new purpose is a greater carbon footprint on the natural environment and a reduced efficiency consumption-rate of precious and scarce natural resources. Integral components that make up pre-fabricated baby seat swing stand systems, inasmuch as the seat and frame (the apparatus that supports the seat) is concerned, are not designed for other uses.

Considering the heightened public awareness of environmental degradation and the direction of the economy gravitating towards a production of more natural products—products that mitigate the negative impact on nature, yet do not sacrifice quality, usefulness, and safety—it is encouraged to produce a production of goods that double-up on existing product intended for other uses. Ideally, quality product that double-up on an existing product, to create a new functional product, that combine safety, usefulness, eco-friendliness, and aesthetic improvements, offer the most value for the widest range of consumers within the marketplace while encouraging to reduce waste and inefficiencies.

It is beneficial to the natural environment to reduce waste creation and dependency on fossil fuel consumption by providing goods production with a more efficient processes and supplying energy needs with alternative energy voluntarily provided by nature. Human energy for powering a device not only saves on expensive electric power consumption and reduces waste but equally important is the physiology as other human productive means of energy are utilized, such as, the hand swaying of a baby swing responsibly helps to improve parent-child interactions as the person swaying often will also interact with the child in the swing. Another benefit of the doubling-up of an existing product is that it creates additional intermediate steps within the production process. Additional steps taken in the way of material efficiency and quality control make for an improvement in the overall quality of the new product doubled-up on. This improvement will likely extend the safety and life of that product, which is a savings that is passed on to the consumer.

As mentioned above, of the many advantages of producing non pre-fabricated products or disposable products, among them being, it would be desirable if there was a way to take an existing product and double-up on it, such as a baby car seat to double-up into a baby car seat swing supported by a crafted structure. It would be desirable if there was a way to take a stand system and use it for different uses other than to support a baby seat swing, such as, a platform for a camera. It would be desirable if the product were quickly and easily assembled for product use and disassembled into smaller pieces for ease of storage or to transport. It would be desirable if the product left less of a carbon footprint on the natural environment and required less use of precious and scarce resources.

Thus, a need exists for a free-standing, easily movable, light-weight, crafted stand system that is not a pre-fabricated disposable product for single-use, but one that can double-up with an existing product (e.g. baby car seat) to create a whole new product (e.g. baby car seat swing and bouncer or camera support stand), and easily assembled by the end-user for product usage and disassembled for storage, and can be stored at reduced costs regarding space and transportability.

SUMMARY OF THE INVENTION

It is an object of the present invention to provide a stand system for suspending a baby car seat on baby car seat sling. The embodiment of the invention allows an individual to suspend and support a weight above the floor.

In the particular embodiment, the stand system incorporates a mounting plate comprising a bolt embedded within the top-center of the mounting plate with threaded head exposed, an anchor embedded within the bottom-center of the mounting plate with closed loop exposed, a spring attached to the anchor's closed loop, three elongated supports comprise of dowel sections form the legs, and a three-way brace connect each foot of the elongated leg to a junction ring across the bottom to prevent the elongated legs from coming apart. The head of each assembled leg connects into a fitting within the mounting plate. The foot of the stand system rests on the floor elevating the mounting plate at a fixed height above the floor in an upright position. Leg placement is positioned away from the vertical center. Such configuration of the stand system provides stability against a downward force, and leverage against lateral force which helps maintain the lateral force acting on the legs at an equilibrium. For successful operation of the product, an individual will responsibly sway or bounce the baby car seat on baby car seat sling with baby in the car seat or use it with a camera to take pictures.

Other key benefits of this stand system: The stand system for the end-user is convenient to assemble for use and convenient to store or transport when not in use. The stand system's elongated legs, joined at the mounting plate, comprise of dowel sections with three-way brace across the bottom enables the stand system to support substantially heavier loads than its opposite height-adjustable tripod stand with leg spreader. The stand system can suspend a weight (e.g. baby car seat on baby car seat sling) from the mounting plate or support a weight (e.g. camera) on top the mounting plate.

Unlike disposal products intended for only single use, the stand system is versatile, in that, it doubles up with an existing product to create a whole new product, intended for use with heavier loads, and may be easily assembled for use and dissembled for compact storage and transportation. The cost of savings on materials and natural resources makes this safe and useful product invention highly desirable from both an expenditure and environmental perspective.

BRIEF DESCRIPTION OF THE SEVERAL VIEWS OF THE DRAWINGS

FIG. 3 shows the components of and a method of making a mounting plate.

FIG. 3A-G shows additional details.

FIG. 4 shows the components of and a method of making an elongated leg.

FIG. 5 shows the components of and a method of making a three-way brace.

FIG. 5A-D shows additional details.

DETAILED DESCRIPTION

Figure 1:
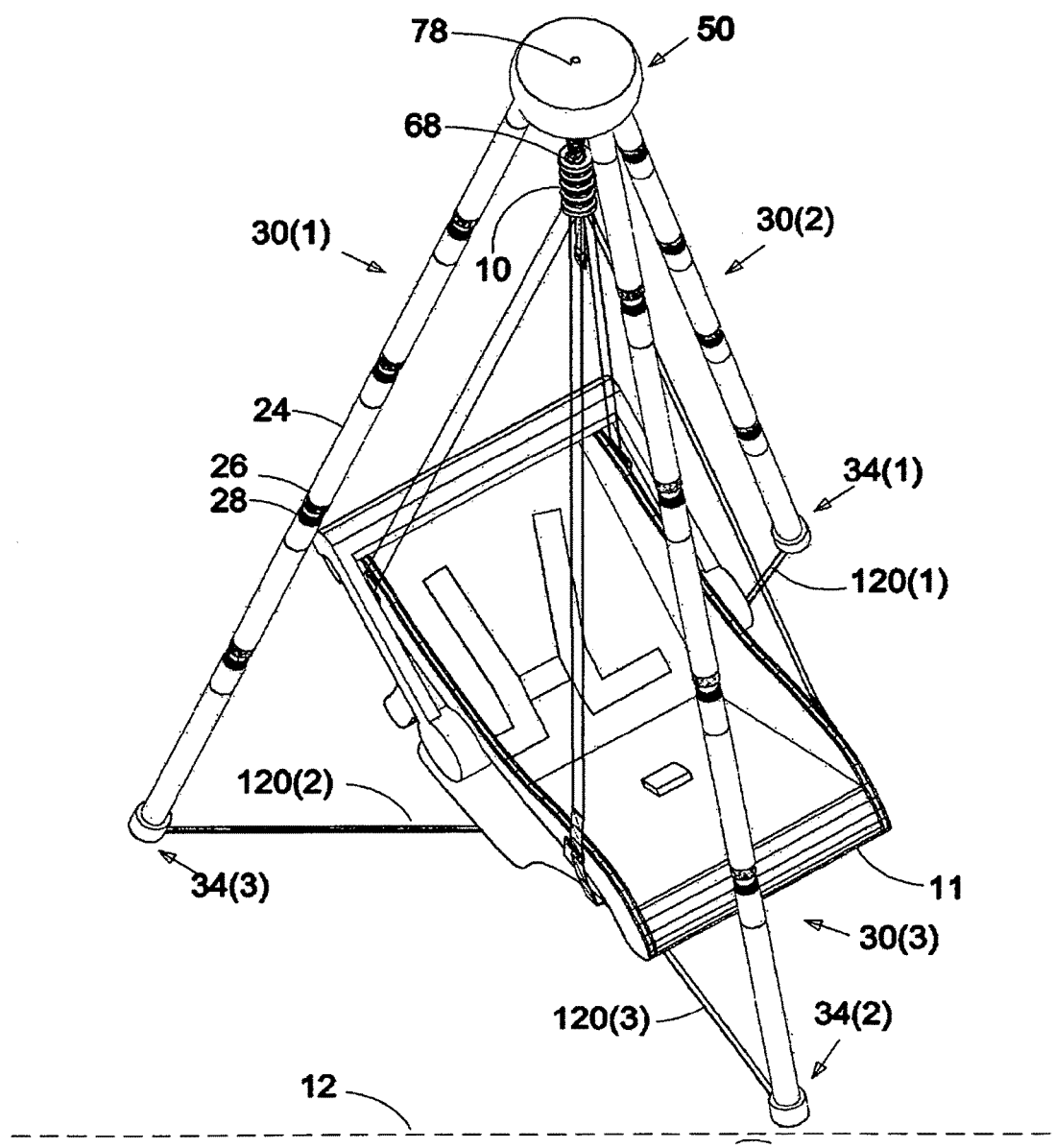
FIG. 1 is a perspective view, showing the present invention with an exemplary baby car seat and baby car seat sling.
Figure 2:
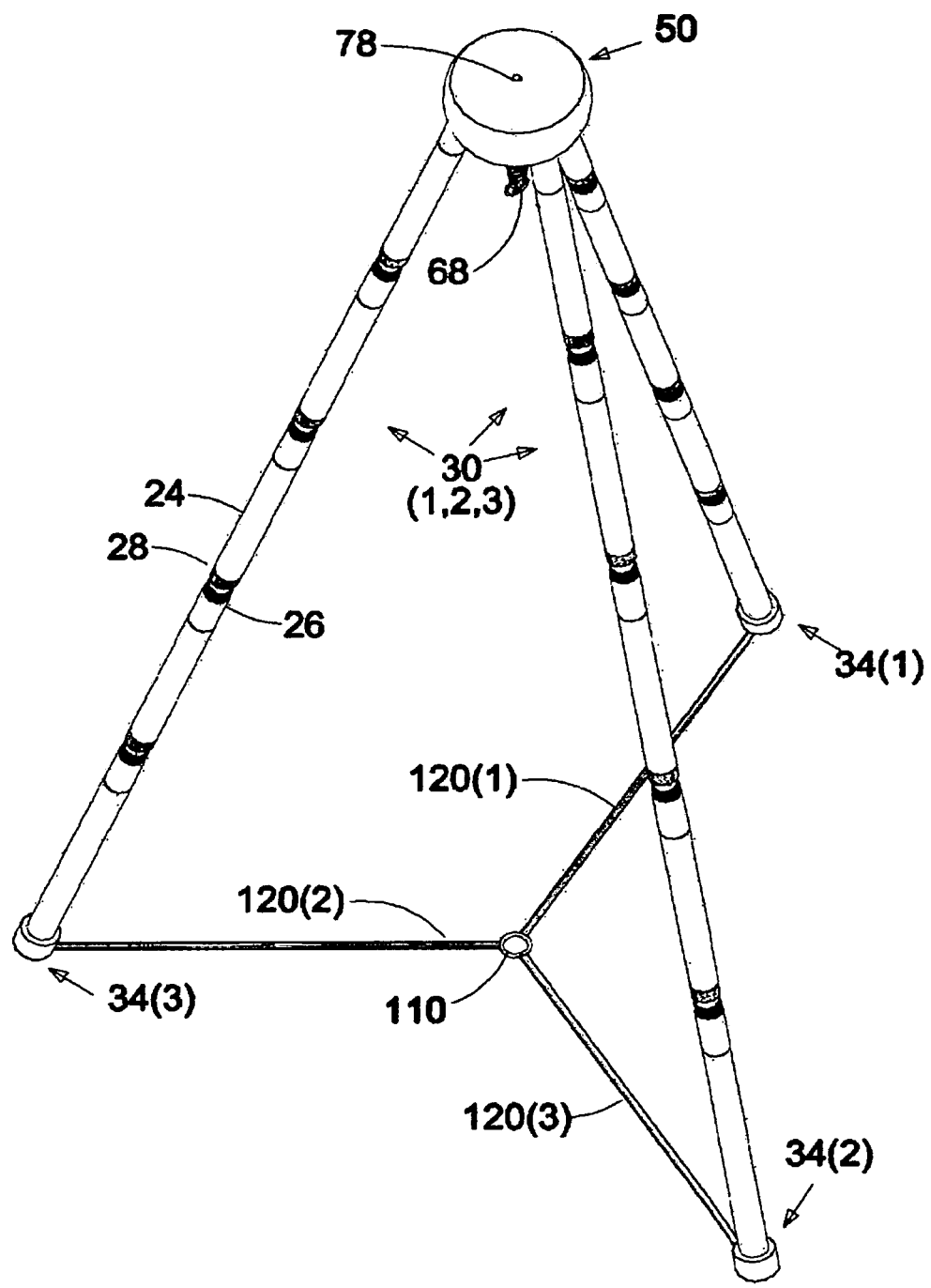
FIG. 2 is a perspective view, showing the present invention without an exemplary baby car seat and baby car seat sling.

FIG. 1 illustrates a perspective view of the stand system with an exemplary baby car seat and baby car seat sling. A baby car seat sling 10 harnessing a baby car seat 11 is suspended from the stand system. A baby car seat sling 10 and baby car seat 11 is shown for illustrative purposes only. FIG. 2 shows a different perspective view of the stand system without an exemplary baby car seat sling and baby car seat.

The stand system comprise a mounting plate 50 elevated above the baby car seat 11 at a fixed height by three elongated leg supports 30 braced together at the foot 34 across the bottom for supporting the baby car seat suspended by a baby car seat sling above the floor which is symbolically represented by a dashed line 12 shown in FIG. 1. It is common that the mounting plate be a part that joins together at one end the supporting legs of a stand system, tripod, stool, table, easel and the like.

FIG. 3 illustrates the mounting plate. The mounting plate is the part of the stand system that attaches the supported baby car seat on baby car seat sling to the elongated legs angled away from the vertical center providing structure stability against lateral and downward forces for suspending the attached weight above the floor. FIG. 3A-G show the components of and a method of making a mounting plate 50. As shown in FIG. 3B, the mounting plate comprise a block 51 cylindrical in shape with convex sides. FIG. 3C shows an anchor 54 bolted into the bottom side 52 of the block 51 and a spring 64 attachment point 66 attached to the anchor loop 58 hangs length-wise vertically. The spring's end 68 is the point of attachment for mounting the baby car seat 10 on baby car seat sling 11, enabling a bounce and swing motion when physically pushed by a human. FIG. 3D shows three holes 82(1), 82(2), & 82(3) bored within the bottom of the block 52—angled, equidistant, and midway between the center and edge of the block 51. FIG. 3E shows threaded connector sockets 84(1), 84(2), & 84(3) for connecting with the head of an elongated leg 32 support are securely contained in the holes within the block 51. FIG. 3F shows a threaded bolt 74 bolted-in one end 76 into the block 51 with only the head 78 exposed for camera installation. An enlarged illustration of the mounting plate 50 and dowel sections that connect to it can be seen in FIG. 3G.

Figures 4A, 4B:
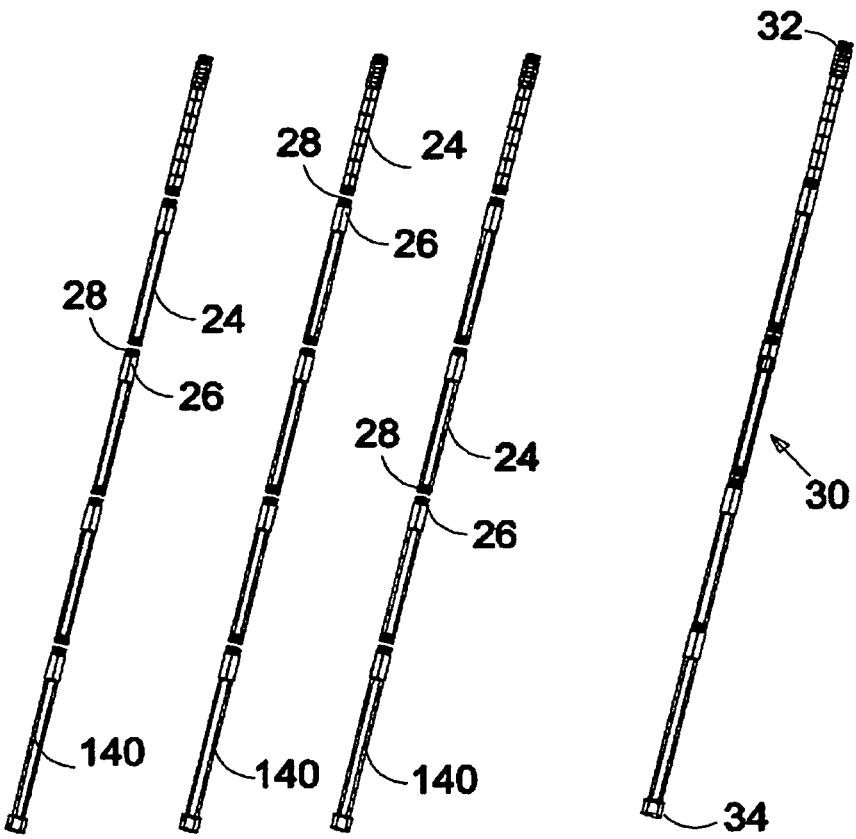
FIG. 4A-C shows additional details.
Figure 4C:
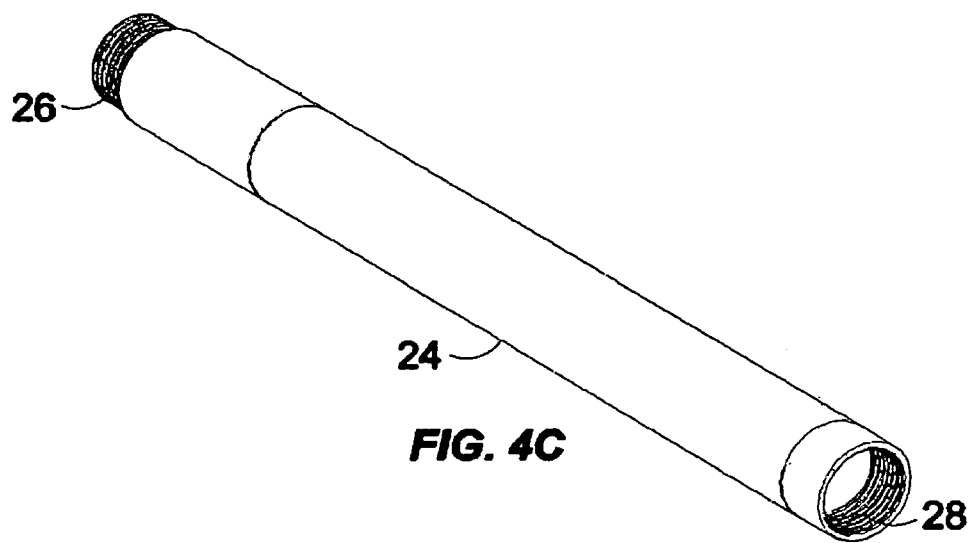
Figure 6:
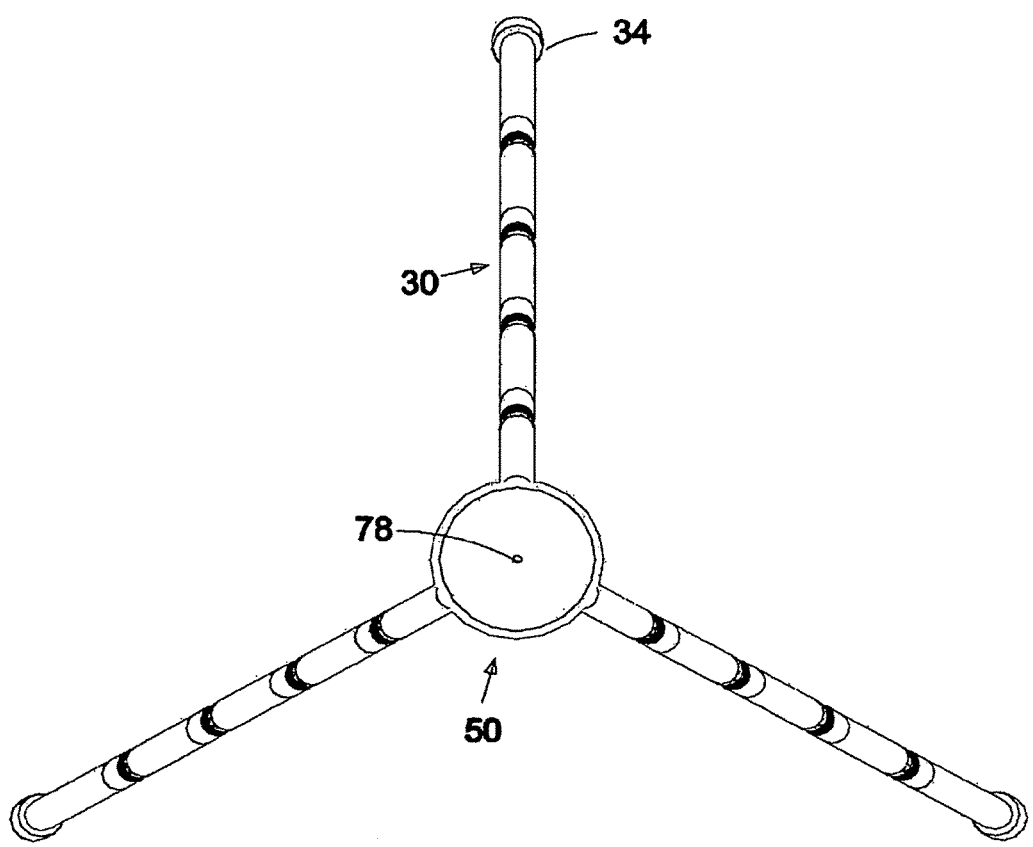
FIG. 6 is a top view, showing the present invention without an exemplary baby car seat and baby car seat sling.
Figure 7:
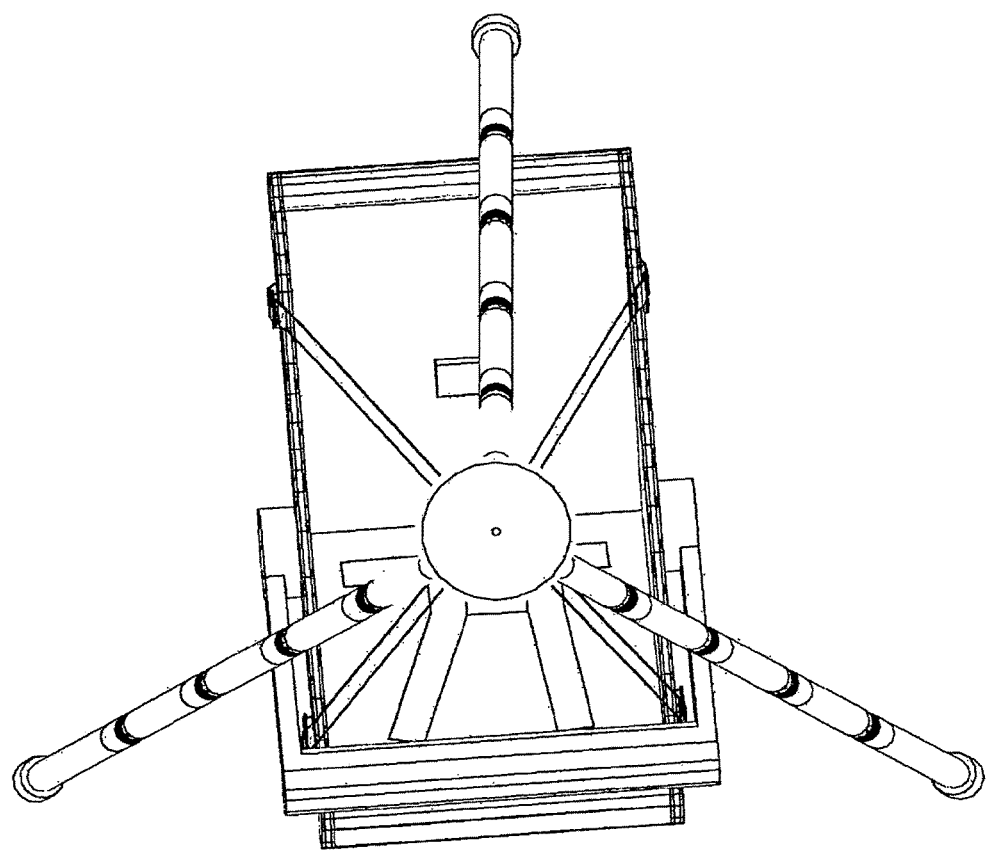
FIG. 7 is a top view, showing the present invention with an exemplary baby car seat and baby car seat sling shown in FIG. 1.
Figure 8:
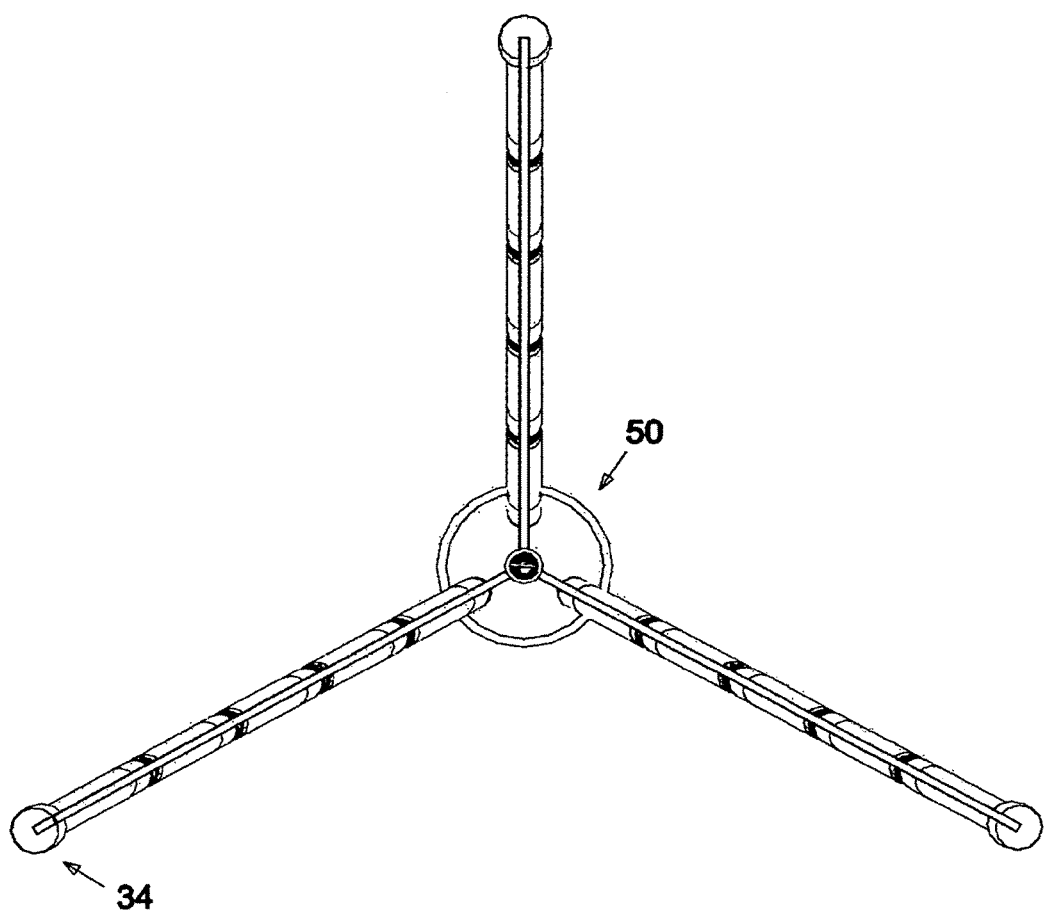
FIG. 8 is a bottom view, showing the present invention without an exemplary baby car seat and baby car seat sling.
Figure 9:
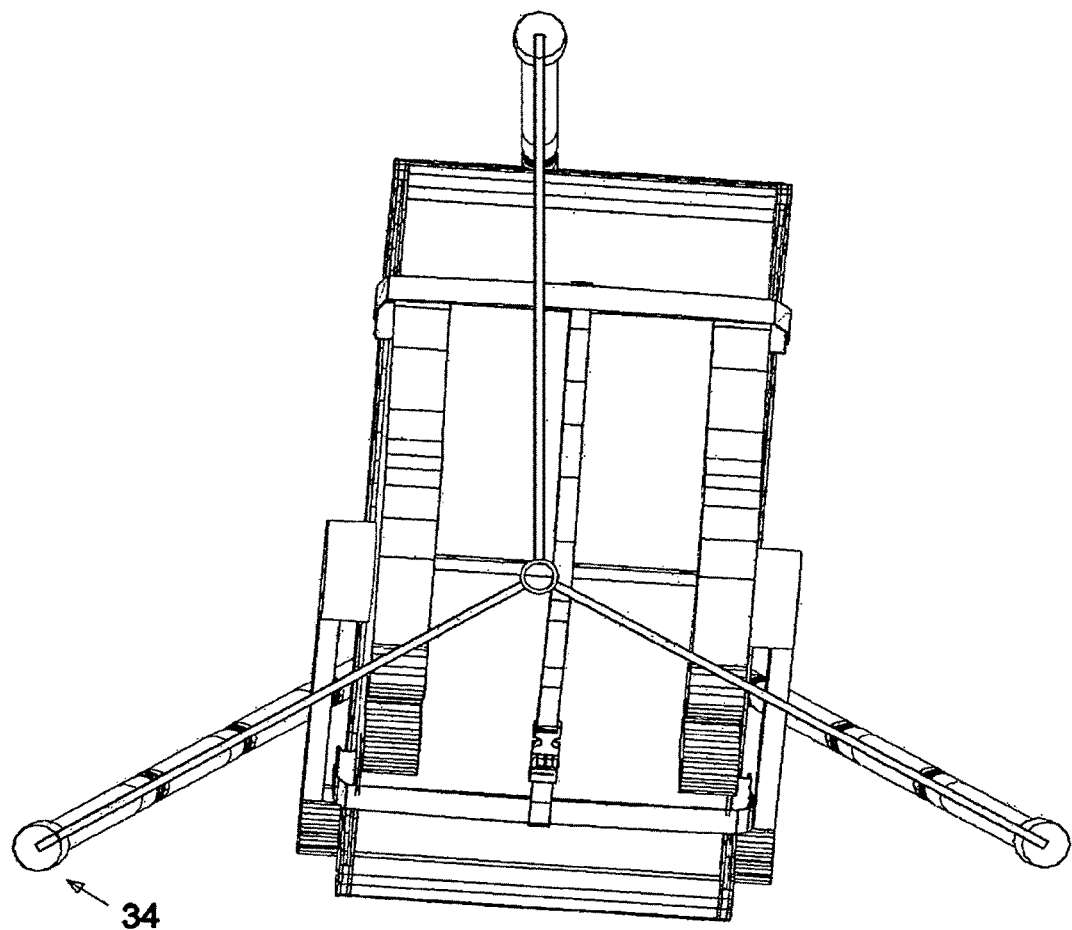
FIG. 9 is a bottom view, showing the present invention with an exemplary baby car seat and baby car seat sling shown in FIG. 1.
Figure 10:
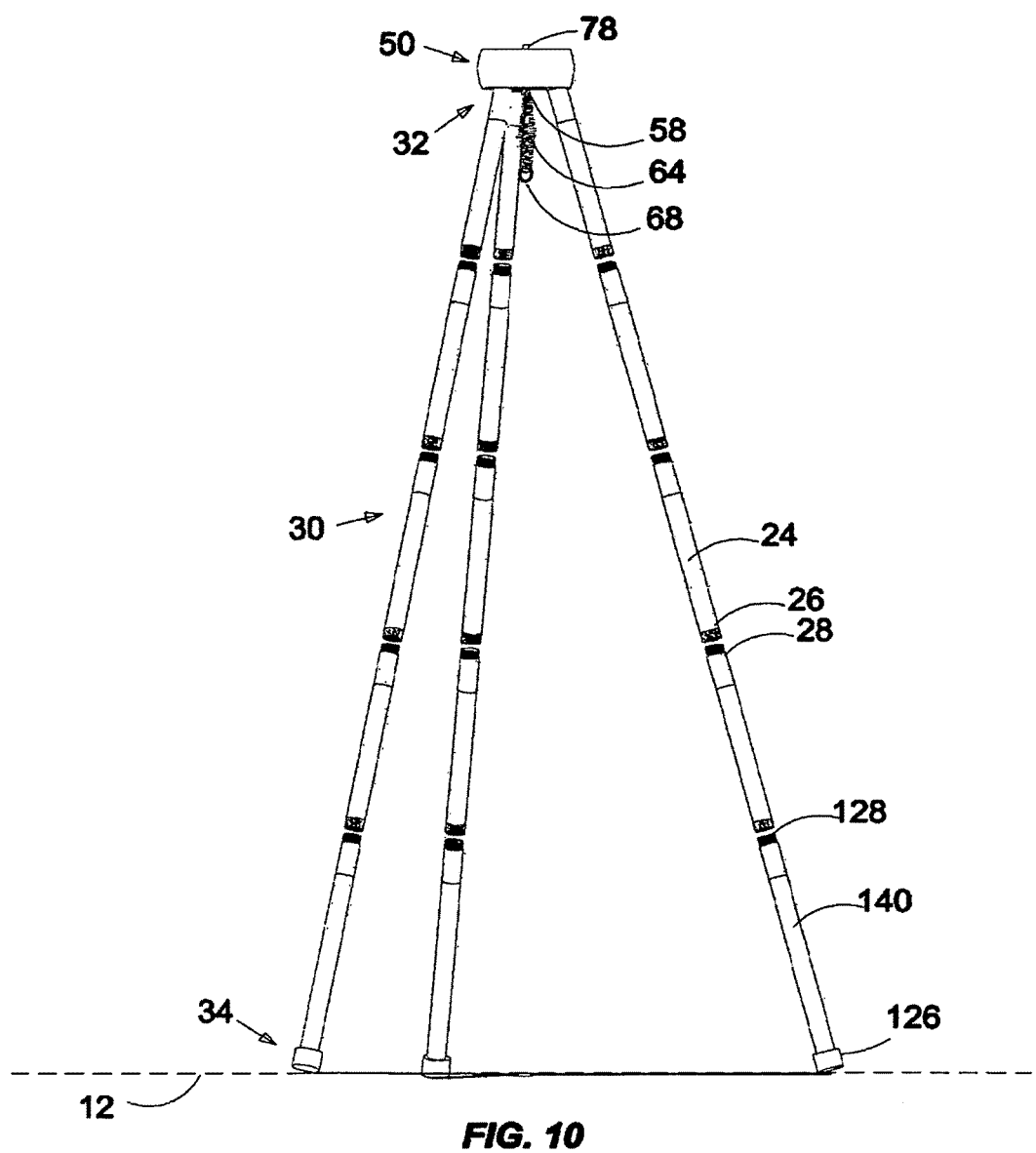
FIG. 10 is a side view, showing the present invention without an exemplary baby car seat and baby car seat sling.
Figure 11:
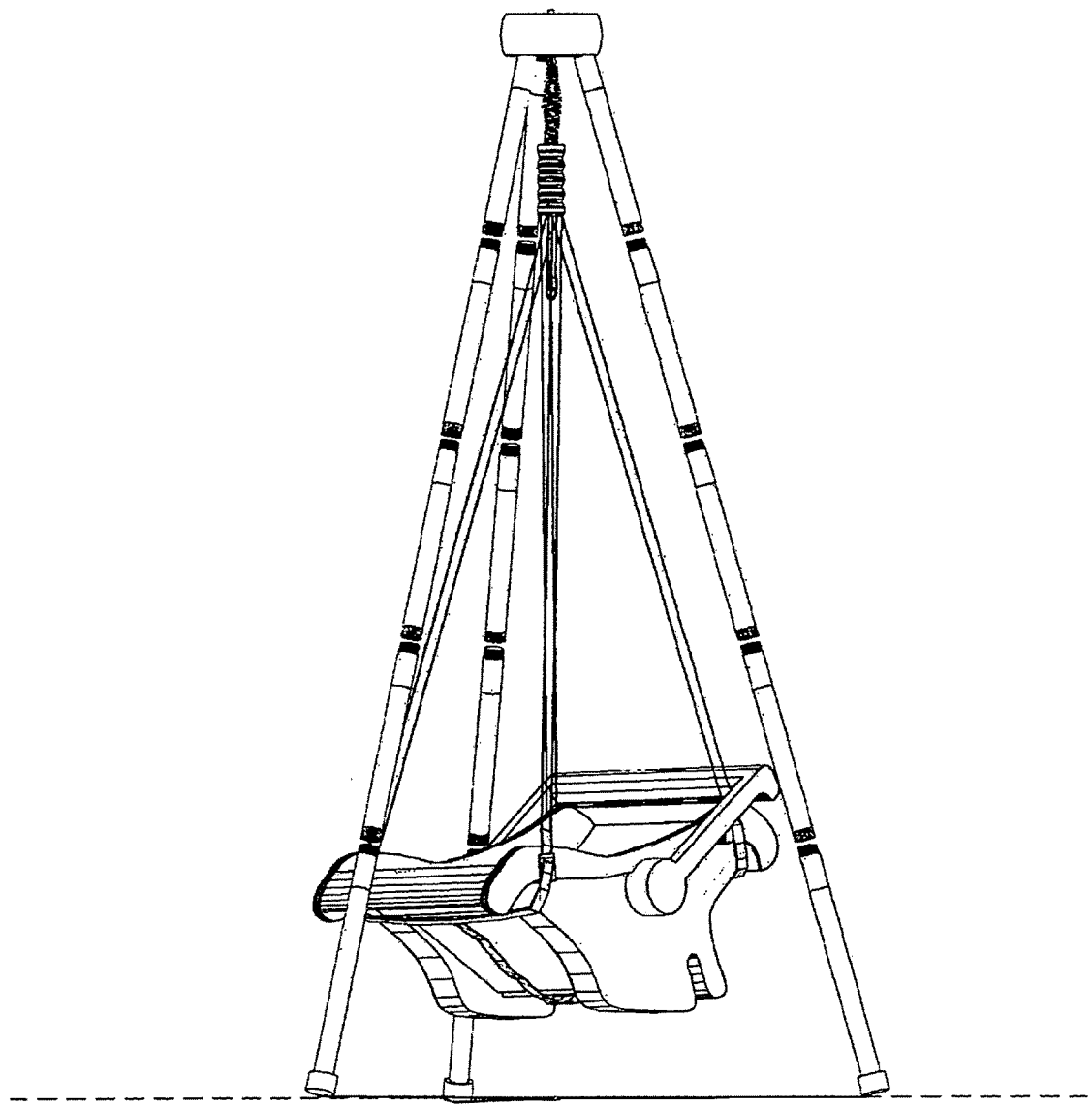
FIG. 11 is a side view, showing the present invention with an exemplary baby car seat and baby car seat sling.

FIG. 4 illustrates the three elongated legs. FIG. 4A-C shows the components of and a method of making the three elongated legs. As shown in FIG. 4A, the elongated legs comprise dowel sections (24,140). Dowels, cylindrical in shape, made of wood, are capable of withstanding loads over a thousand pounds when placed parallel to the grain along the longitudinal axis corresponding to the vertical orientation. FIG. 4B shows the dowel sections joined together by male-to-female union cascading in a series of 5 sections to form an elongated leg. The tops of the assembled legs 32 connect to the mounting plate as previously shown in FIG. 3F, and the bottoms of the assembled legs 34 rest on floor 12 represented by a dashed line as previously shown in FIG. 1. FIG. 4C shows an enlarged perspective view of an intermediate dowel sections 24 with male-end 26 and a female-end 28.

FIG. 5 illustrates the 3-way brace that interconnects the elongated legs at the foot-end section of each elongated leg. Each elongated leg at the foot 34 is linked by an equal length strap attached from a ring restrained by a crimp clamp on the foot-end dowel section 140 to a junction ring 110 located center across the bottom completes the 3-way brace of the stand system. FIG. 5A-D shows the components of and a method of making the 3-way brace interconnecting the three elongated legs at the foot 126 of the foot-end dowel section 140. FIG. 5A shows the foot-end dowel section 140 with a male-end 128 and a truncated-end 126. The foot 126 of the foot-end dowel section 140 comprise a rubber tip 92, a ring 96, a crimp clamp 94, and strap 120 shown in FIG. 5B. FIG. 5C shows the assembled components on the foot end 126 of the foot-end dowel section 140. The rubber tip 92 provides holding strength and prevents floor damage. As shown in FIG. 5D the junction ring 110 with gap 112 traps the 3 straps 120(1), 120(2), 120(3), wherein the strap 120 end at the junction ring can only be removed from the junction ring sliding it thru the opening 112 by hand. Whereas, the opposite end of the strap 120 from junction ring 110 extends to a ring 96 on the foot end of the foot-end dowel section 140 of each elongated leg. The ring 96 is a closed loop on the foot-end dowel section 140. The strap 120 is trapped in the ring by the ends of the strap folded over the ring and onto itself to form a closed loop as shown in FIG. 5C. The strap ends form a loop. The loop end is guided thru the junction ring opening 112 and becomes trapped in the ring, as shown in FIG. 5D. The strap 120 between the foot-end dowel section and junction ring interconnection prevents the legs from coming apart under relatively heavy tension. FIG. 5E illustrates the 3-way brace components assembled.

The foregoing detailed description is an illustration and not a definition of the invention. Only the claims are intended to define the scope of this invention.

What I claim as my invention is:

1. A stand system intended for suspending, a baby car seat suspended on a baby car seat sling, wherein the baby car seat sling has a strap harness that extends around a first side, a second side and bottom contours of the baby car seat rigid shell and strap ends meet at a suspension point junction above the baby car seat, wherein the suspension point junction on the baby car seat sling hangs from the stand system; the stand system comprising:
   a mounting plate configured to be mounted above the suspension point junction on the baby car seat sling harnessing a baby car seat,
   wherein the mounting plate comprises of a block containing three internal sockets with a plurality of threads and exposes a closed loop anchor bolt located on a center of a bottom-side surface of the mounting plate and
   a spring with matching ends, wherein a first end of the spring connects to the anchor bolt and a second end configured to be connected to the suspension point junction for the suspension of a baby car seat on a sling, and
   a bolt partially embedded in the mounting plate located on a center of a top surface of the mounting plate exposes a plurality of threads above the top surface of the mounting plate for supporting a load;
   a structural frame comprises of three elongated legs, wherein each leg having a head-end and a foot-end, wherein each elongated leg assembly comprises a plurality of dowel sections assembled in an end-to-end relationship and cascadable in a series of four intermediary dowel sections and one foot-end dowel section, wherein the four intermediary dowel sections each having a male-end and a female-end and the one foot-end dowel section having a male-end and a truncated-end, wherein each of the male-ends of the intermediary dowel section and the male-end of the one-foot end dowel section connects to the respective female ends of the intermediary dowel section thereby forming the elongated leg comprising a head-end and a truncated-end,
   wherein the head-ends interconnects to the respective internal socket at a fixed angular position, equidistant, and midway between the center and edge of the bottom surface of the mounting plate, and
   a bottom of a foot connected to a truncated-end dowel section of the elongated leg for resting on a surface of a floor; and
   a three-way brace connected to the truncated-end dowel section of each elongated leg interconnects each of the three elongated legs at the foot to a junction ring centered across the bottom, wherein
   a bracing link is affixed onto the truncated-end dowel section onto a rubber foot secured by a crimp clasp, wherein the bracing link affixed onto the truncated-end dowel section interconnects the three elongated legs with the junction ring centered across the bottom.

2. The stand system of claim 1 further comprising the load, wherein the load rests on top of the stand system comprising the mounting plate, used as a platform that is elevated above the floor surface, wherein the load rests on the top surface of the mounting plate.

\* \* \* \* \*